United States Patent Office 3,453,336
Patented July 1, 1969

3,453,336
4-DICHLOROMETHYLENECYCLOHEXENE
Arthur D. Ketley, Bethesda, Md., assignor to W. R. Grace & Co., New York, N.Y., a corporation of Connecticut
No Drawing. Filed Sept. 26, 1966, Ser. No. 581,694
Int. Cl. C07c 23/10, 17/00
U.S. Cl. 260—648                    2 Claims

ABSTRACT OF THE DISCLOSURE 4-dichloromethylenecyclohexene is prepared by heating an inert pyrolysis reaction zone packed with indifferent material to a temperature of 250–350° C. and passing 7,7-dichlorobicyclo [4,1,0] heptene-2 in vapor form thru the zone to form a vapor containing 4-dichloromethylenecyclohexene vapor and condensing the vapor.

---

This invention relates to a new composition of matter. In one particular aspect this invention relates to 4-dichloromethylenecyclohexene. In another particular aspect this invention relates to a process for preparing 4-dichloromethylenecyclohexene.

Briefly stated, the process of the present invention comprises heating a substantially inert pyrolysis reaction zone packed with substantially indifferent material to a temperature in the range of 250 to 350° C., passing 7,7-dichlorobicyclo [4,1,0] heptene-2 in vapor form through said reaction zone for a period of time sufficient to form a vapor containing 4-dichloromethylenecyclohexene and condensing the resulting vapor.

7,7-dichlorobicyclo [4,1,0] heptene-2 may be prepared by the reaction of 1, 3-cyclohexadiene, chloroform and potassium-t-butoxide. The action of the potassium-t-butoxide on the chloroform generates dichlorocarbene having the formula :CCl$_2$ which reacts with the 1,3-cyclohexadiene to form 7,7-dichlorobicyclo [4,1,0] heptene-2.

The preparation of 7,7-dichlorobicyclo [4,1,0] heptene-2 and its thermal rearrangement to 4-dichloromethylene cyclohexene may be illustrated in equation form as follows:

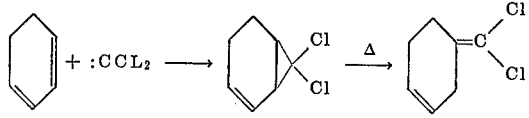

The pyrolysis of 7,7-dichlorobicyclo [4,1,0] heptene-2 in the instant process should be carried out in a substantially inert zone, i.e. under anhydrous conditions in the absence of air, to avoid side reactions. Any conventional method may be used to provide the desired inert conditions. Usually, an atmosphere of a substantially dry inert gas, such as nitrogen or argon, in the pyrolysis zone provides satisfactory inert conditions.

The temperature of the pyrolysis reaction may range from 250 to 350° C. Generally, temperatures lower than 250° C. will not convert the 7,7-dichlorobicyclo [4,1,0] heptene-2 to 4-dichloromethylenecyclohexene in significant amounts. On the other hand, temperatures higher than 350° C. ordinarily will cause the 4-dichloromethylenecyclohexene to dehydrochlorinate to give a complex mixture of chloroalkenes.

The pressure of the pyrolysis reaction may range from 0.1 to 10 atmospheres. Atmospheric pressure, however, is preferred.

In the process of the present invention, the 7,7-dichlorobicyclo [4,1,0] heptene-2 is conducted through a heated pyrolysis reaction zone. For example, the compound may be passed through a pyrolysis reaction tube provided with equipment for heating. The reaction tube may be of porcelain, glass or quartz. Heat may be applied to the tube by a gas-fired furnace, an electric furnace, or by a simple winding of the tube with electrically heated resistance wire. The temperature of the tube may be recorded by manual or automatic devices. A protected thermocouple may be placed within the reaction tube if the tube is big enough.

The pyrolysis reaction zone should be packed with a substantially indifferent, i.e. inert, material of high surface area. The packing must be substantially inert so that it will not catalyze the pyrolysis reaction to produce products other than the desired 4-dichloromethylenecyclohexene. In addition, the packing should have high surface area so that substantially all of the vapor passed through the packed reaction zone is contacted with a surface heated to pyrolizing temperature. As a result, the 4-dichloromethylenecyclohexene vapor is subjected to pyrolizing temperature uniformly.

Representative of the substantially inert materials suitable for use as packing in the pyrolysis reaction zone are glass fibers such as glass wool, glass particles such as glass helices and porcelain particles such as porcelain saddle.

The amount of the 4-dichloromethylenecyclohexene produced according to the instant invention will depend largely on the specific temperature of the pyrolysis reaction and the residence time of the 7,7-dichlorobicyclo [4,1,0] heptene-2 in the pyrolysis reaction zone. Generally, with a residence time of ½ to 2 hours in the reaction zone at atmospheric pressure, the amount of 4-dichloromethylenecyclohexene produced in the temperature range of 250° C. to 350° C. will be about 30 to 75 percent by weight of the starting material.

4-dichloromethylenecyclohexene can be polymerized by using those free radical initiators that are effective for polymerizing vinyl chloride and vinylidene chloride. The polymerization process can be carried out in a manner conventional for polymerizing vinyl chloride and vinylidene chloride. The resulting polymer of 4-dichloromethylenecyclohexene is suitable for a number of uses. It can be shaped by conventional techniques such as molding to form clear, transparent continuous films suitable for packaging. Copolymers of 4-dichloromethylenecyclohexene can also be formed. Typical comonomers are chloroalkenes such as vinyl chloride and vinylidene chloride.

All parts and percentages used herein are by weight unless otherwise indicated.

This invention is further illustrated by the following examples.

Unless otherwise stated, tests in the following examples were made as follows:

Gas chromatograms were prepared on a Perkin-Elmer Vapor Fractometer, Model 154, having a Perkin-Elmer "K" column and "R" column in series at 125° C.

The structure of the compounds was verified by nuclear magnetic resonance spectroscopy. The compound was dissolved in carbon tetrachloride to form a solution equivalent to 15 parts by weight of the compound in 100 cc. of carbon tetrachloride. The solution was then analyzed on a Varian "HR 60 Nuclear Magnetic Resonance Spectrometer" using tetramethylsilane as an internal reference.

Example 1

In this example, 7,7-dichlorobicyclo [4,1,0] heptene-2 was prepared.

A one liter four-necked reaction flask equipped with stirrer, dropping funnel, thermometer and condenser was used.

A flow of substantially dry argon was introduced into the flask and maintained throughout the reaction to provide anhydrous conditions.

The flask was flamed out under the argon and allowed to cool to room temperature. It was then immersed in a bath comprised of partially frozen carbon tetrachloride having a temperature of about −23° C. 500 ml. of sodium-dried n-pentane were added to the cooled flask.

33.7 g. of potassium t-butoxide were slurried in the n-pentane in the reaction flask.

46.2 g. of 1,3-cyclohexadiene which had been dried by passing it through a column of anhydrous calcium sulfate ("Drierite") and a column of anhydrous silica gel, was precooled to 0° C. and added with stirring to the reaction flask.

The resulting mixture was cooled to 0° C.

34.6 g. of chloroform, precooled to 20° C., were then slowly added to the mixture with stirring for about one hour. During this time the mixture was maintained at 0° C. At the end of the hour, the reaction was stopped by pouring the reaction mixture into dilute hydrochloric acid. The resulting organic layer was separated and distilled to produce 7,7-dichlorobicyclo [4,1,0] heptene-2. This compound had a boiling point of 65° C. at 5.5 mm. The structure of 7,7-dichlorobicyclo [4,1,0] heptene-2 was verified by nuclear magnetic resonance spectroscopy, infrared analysis and elemental analysis.

Example 2

In this example, 7,7-dichlorobicyclo [4,1,0] heptene-2 was thermally rearranged to 4-dichloromethylenecyclohexene.

A glass ("Pyrex") pyrolysis reaction tube, 24 inches in length and 27 mm. in diameter, was packed tightly with glass wool. A thermocouple, encased in a glass capillary tube, was placed in the center of the pyrolysis reaction tube along a substantial length of the tube.

The reaction tube was placed in a vertical position and dry nitrogen was introduced into the top of the tube at a rate of about 15 to 20 ml. per minute. The reaction tube was wrapped with heating tape, the temperature of which was regulated by a powerstat. The top portion of the tube was provided with a dropping funnel. The bottom portion of the tube was connected to a condenser which was provided with a receiving flask.

A control gas chromatogram of the 7,7-dichlorobicyclo [4,1,0] heptene-2 was made to evaluate the extent of the pyrolysis reaction.

The pyrolysis tube was raised to a temperature of 275° C. 35 ml. of the 7,7-dichlorobicyclo [4,1,0] heptene-2 were introduced into the top of the pyrolysis reaction tube at a rate of 100 ml. per hour. The resulting condensate was passed back through the reaction tube 11 times. The final condensate was a slightly brown liquid which was distilled in a vacuum line at room temperature and a pressure of $10^{-4}$ millimeters of mercury.

A gas chromatogram was made of the final condensate and compared to the control gas chromatogram. Areas under the peaks of the chromatograms were determined.

The comparison showed that the condensate was comprised of about 36% of benzyl chloride and about 64% of a compound determined to be 4-dichloromethylenecyclohexene.

The 4-dichloromethylenecyclohexene was separated from the condensate by preparative vapor phase chromatography.

The structure of the 4-dichloromethylenecyclohexene was then verified by nuclear magnetic resonance spectroscopy, infrared analysis and elemental analysis.

Elemental analysis of the compound showed it to be comprised of C, 51.72; H, 4.94; and Cl, 42.83.

The nuclear magnetic resonance spectrum of the compound consisted of a narrow methylene signal of $\tau 8.15$ (relative area 3) and an olefinic proton signal at $\tau 4.33$ (relative area).

Example 3

To a ten ml. glass tube flushed with nitrogen there was added 2 ml. of 4-dichloromethylenecyclohexene and 4 ml. of n-butyraldehyde. 0.05 g. of azodi-isobutyronitrile was then added to the tube and the tube was sealed and heated at 50° C. overnight. The tube was then cooled to room temperature, opened and the contents poured into methanol. The precipitated polymer was washed with cold methanol and dried in a vacuum oven. 1.2 g. of white powder were obtained which melted in the range of 125–138° C.

0.5 g. of the polymer was pressed at 100° C. at 10,000 p.s.i. between aluminum plates in a platen press. A clear transparent continuous film resulted which adhered strongly to the aluminum.

What is claimed is:

1. A process of preparing 4-dichloromethylenecyclohexene which comprises heating a substantially inert reaction zone packed with substantially indifferent material to a temperature in the range of 250° C. to 350° C., passing 7,7-dichlorobicyclo [4,1,0] heptene-2 in vapor form through said heated reaction zone for a period of time sufficient to form a vapor containing 4-dichloromethylenecyclohexene, and condensing the resulting vapor.

2. A process according to claim 1 wherein the temperature is 275° C.

References Cited

Heiba, E. I., et al., Gamma-Ray-Initiated Reactions, I. The addition of bromotrichloromethane to alkenes. Chemical Abstracts, vol. 52, 1958, 3754h.

JOSEPH L. SCHOFER, *Primary Examiner.*

JOHN A. DONAHUE, JR., *Assistant Examiner.*

U.S. Cl. X.R.

260—875, 877, 915